(12) United States Patent
Muck et al.

(10) Patent No.: US 7,450,490 B2
(45) Date of Patent: Nov. 11, 2008

(54) CHANNEL ESTIMATION USING THE GUARD INTERVAL OF A MULTICARRIER SIGNAL

(75) Inventors: Markus Muck, Paris (FR); Marc De Courville, Paris (FR); Merouane Debbah, Antibes (FR)

(73) Assignee: Motorola, Inc., Schaumburg, IL (US)

( * ) Notice: Subject to any disclaimer, the term of this patent is extended or adjusted under 35 U.S.C. 154(b) by 502 days.

(21) Appl. No.: 10/531,785

(22) PCT Filed: Oct. 30, 2003

(86) PCT No.: PCT/EP03/50767

§ 371 (c)(1),
(2), (4) Date: Apr. 18, 2005

(87) PCT Pub. No.: WO2004/064344

PCT Pub. Date: Jul. 29, 2004

(65) Prior Publication Data

US 2006/0120275 A1    Jun. 8, 2006

(30) Foreign Application Priority Data

Oct. 31, 2002  (EP)  ................................ 02292730

(51) Int. Cl.
*H04K 1/10* (2006.01)
(52) U.S. Cl. .................................. 370/208; 375/260
(58) Field of Classification Search .................. 370/210
See application file for complete search history.

(56) References Cited

U.S. PATENT DOCUMENTS

| | | | | |
|---|---|---|---|---|
| 5,193,115 | A * | 3/1993 | Vobach | 380/46 |
| 5,495,432 | A * | 2/1996 | Ho | 708/313 |
| 6,369,758 | B1 * | 4/2002 | Zhang | 342/383 |
| 2002/0044524 | A1 * | 4/2002 | Laroia et al. | 370/203 |
| 2002/0048333 | A1 * | 4/2002 | Ahmed et al. | 375/346 |
| 2003/0072382 | A1 * | 4/2003 | Raleigh et al. | 375/267 |
| 2006/0104195 | A1 | 5/2006 | Nakahara et al. | |

OTHER PUBLICATIONS

Muquet et al.: "Reduced complexity equalizers for zero-padded OFDM transmissions", IEEE International Conference on Acoustics, Speech, and Signal Processing, Jun. 5-9, 2000, pp. 2973-2976.
Muquet, Bernard et al.: OFDM With Trailing Zeros Versus OFDM with Cyclic Prefix: Links, Comparisons and Application to the HiperLAN/2 System, Communications, 2000. ICC 2000. 2000 IEEE International Conference on, USA, Jun. 22, 2000, vol. 2 pp. 1049-1053.

* cited by examiner

*Primary Examiner*—Kevin C. Harper
*Assistant Examiner*—Sai-Ming Chan
(74) *Attorney, Agent, or Firm*—Brian M. Mancini

(57) ABSTRACT

A method of communication using Orthogonal Frequency Division Multiplexing ("OFDM") comprises generating bit streams ($b_n \epsilon (0,1), n=0,1,\ldots,K-1$) and the corresponding sets of frequency domain carrier amplitudes ($X_O(k)$ to $X_N(k)$), where k is the OFDM symbol number, modulated as OFDM symbols to be transmitted from a transmitter. Prefixes are inserted as guard intervals in the sample streams and the OFDM symbols are transmitted from the transmitter to a receiver. The receiver uses information from the prefixes to estimate the Channel Impulse Response ($H^{(F)}_D$) of the transmission channels and uses the estimated Channel Impulse Response ($\hat{H}^{(F)}_D$) to demodulate the bit streams in the signals received. The prefixes ($\alpha_k \cdot c_o$ to $\alpha_k \cdot c_{D-1}$) are deterministic and are known to the receiver as well as to the transmitter. Preferably, the prefixes ($\alpha_k \cdot c_o$ to $\alpha_k \cdot c_{D-1}$) comprise a vector ($P_D$) that is common to said symbols multiplied by at least one weighting factor ($\alpha_k$). The weighting factor ($\alpha_k$) preferably differs from one symbol to another but the elements of a given vector ($P_D$) are multiplied by the same weighting factor. Preferably, the weighting factor ($\alpha_k$) has a complex pseudo-random value.

14 Claims, 5 Drawing Sheets

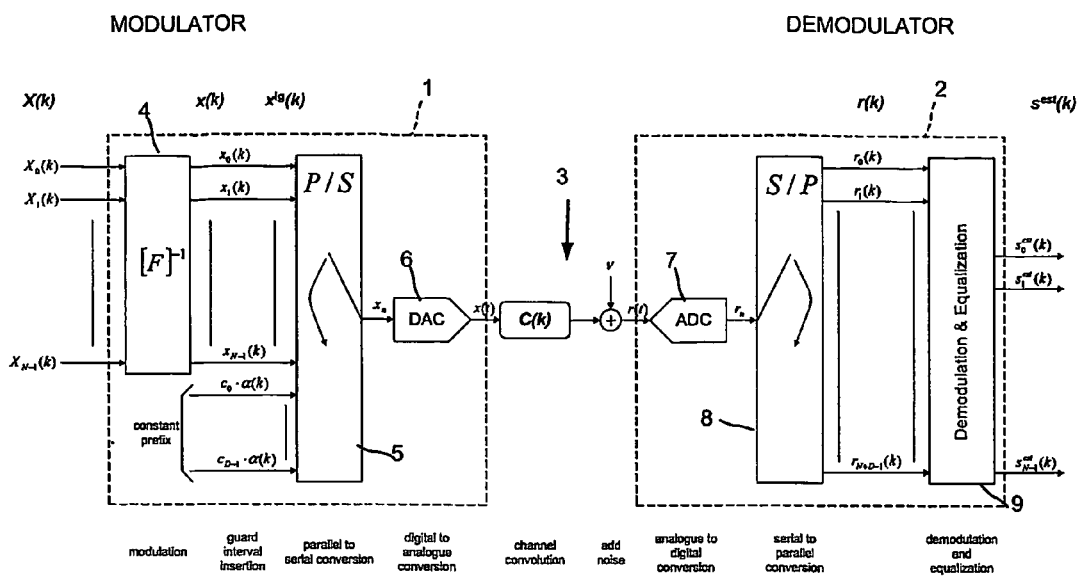

Figure 1

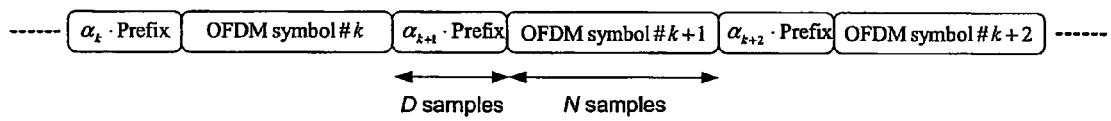

Figure 2

$$= [H_{IBI}] = \begin{pmatrix} 0 & \to & 0 & h_{D-1} & h_{D-2} & \to & h_1 \\ \downarrow & \searrow & \searrow & \searrow & h_{D-1} & \searrow & h_2 \\ \downarrow & \searrow & \searrow & \searrow & \searrow & \searrow & \downarrow \\ \downarrow & \searrow & \searrow & \searrow & \searrow & \searrow & h_{D-1} \\ \downarrow & \searrow & \searrow & \searrow & \searrow & \searrow & 0 \\ \downarrow & \searrow & \searrow & \searrow & \searrow & \searrow & \downarrow \\ 0 & \searrow & \searrow & \searrow & \searrow & \searrow & 0 \end{pmatrix}$$

Figure 3

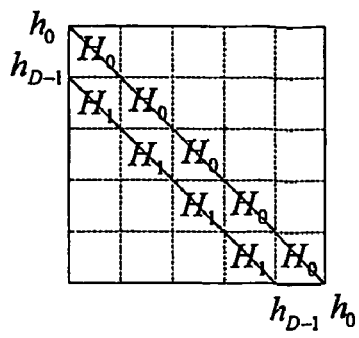
Figure 4
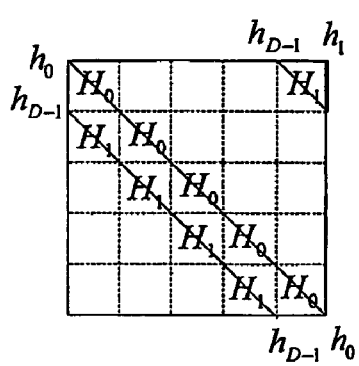
Figure 5
$$[H] = \begin{pmatrix} h_0 & \rightarrow & h_2 & h_1 \\ h_1 & \searrow & h_3 & h_2 \\ \downarrow & \searrow & \searrow & \downarrow \\ h_{D-1} & \rightarrow & h_1 & h_0 \end{pmatrix}$$
Figure 6

$$[\mathcal{H}_1] = \begin{pmatrix} 0 & h_{D-1} & \rightarrow & h_2 & h_1 \\ 0 & \searrow & \searrow & h_3 & h_2 \\ \downarrow & \searrow & \searrow & \searrow & \downarrow \\ \downarrow & \searrow & \searrow & \searrow & h_{D-1} \\ 0 & \searrow & \searrow & 0 & 0 \end{pmatrix}$$

Figure 7

$$[\mathcal{H}_0] = \begin{pmatrix} h_0 & 0 & \rightarrow & \rightarrow & 0 \\ h_1 & h_0 & 0 & \searrow & \downarrow \\ \downarrow & \searrow & \searrow & \searrow & \downarrow \\ \downarrow & \searrow & \searrow & \searrow & 0 \\ h_{D-1} & h_{D-2} & \rightarrow & \rightarrow & h_0 \end{pmatrix}$$

CHANNEL ESTIMATION USING THE GUARD INTERVAL OF A MULTICARRIER SIGNAL

FIELD OF THE INVENTION

This invention relates to communication using Orthogonal Frequency Division Multiplexing ('OFDM') and, more particularly, to channel estimation and tracking in OFDM communication.

BACKGROUND OF THE INVENTION

OFDM communication has been chosen for most of the modern high-data rate communication systems (Digital Audio Broadcast—DAB, Terrestrial Digital Video Broadcast—DVB-T, and Broadband Radio Access Networks—BRAN such as HIPERLAN/2, IEEE802.11a, for example). However, in most cases the receiver needs an accurate estimate of the channel impulse response.

In many known OFDM systems, each OFDM symbol of size N∈N$^+$ is preceded by a guard interval that is longer than the channel impulse response (CIR) and a cyclic prefix of D∈N$^+$ samples is inserted as the guard interval at the transmitter, the prefix consisting of D samples circularly replicated from the useful OFDM symbol time domain samples. The cyclic prefix enables very simple equalisation at the receiver, where the cyclic prefix is discarded and each truncated block is processed, for example using Fourier Transform (usually Fast Fourier Transform), to convert the frequency-selective channel output into N parallel flat-faded independent sub-channel outputs, each corresponding to a respective sub-carrier. For equalisation purposes, numerous strategies exist. Following the zero forcing approach, for example, each sub-channel output is, unless it is zero, divided by the estimated channel coefficient of the corresponding sub-carrier.

Like other digital communication systems, OFDM modulation encounters problems at high Doppler spreads, which occur notably when the user is moving fast, for example in a car. HIPERLAN/2, for example, was designed to work only up to speeds of 3 m/s ("pedestrian speed"). Accordingly, the channel impulse response needs to be constantly tracked and updated, especially in the presence of high Doppler spreads.

In a known OFDM communication system pilot tones are added which may change their position from one OFDM symbol to another. The amplitudes and positions of the pilot tones are known to the receiver. The receiver uses the pilot tones to estimate the channel coefficients of the corresponding carriers. This method is widely used, but it degrades the system performance, since a certain number of carriers cannot be used for data, since they are reserved for the pilot tones.

It is also known to add learning sequences (See for example EBU Review Technical No. 224, August 1987, "Principles of modulation and channel coding for digital broadcasting for mobile receiver", by M. Alard and R. Lassalle.). In HIPERLAN/2, for example, there are at least 2 learning OFDM symbols per frame (i.e. 2 OFDM symbols of 2·4 μs duration in total per 2 ms). If the channel changes quickly, there must be many more training sequences and the consequence is an even bigger degradation in the system performance.

Many of the known systems are unable to decode all carriers of OFDM symbols in the presence of channel nulls. Recent innovations propose ways for decoding OFDM symbols even in the presence of channel nulls (see for example the publication entitled "Reduced Complexity Equalizers for Zero-Padded OFDM transmissions" by B. Muquet, Marc de Courville, G. B. Giannakis, Z. Wang, P. Duhamel in the proceedings of the International Conference on Acoustics Speech and Signal Processing ('ICASSP') 2000 and the publication entitled "OFDM with trailing zeros versus OFDM with cyclic prefix: links, comparisons and application to the HiperLAN/2 system" by Muquet, B.; de Courville, M.; Dunamel, P.; Giannakis, G. in the proceedings of the IEEE International Conference on Communications, 2000, Volume: 2. However, these publications do not offer responses to the problems referred to above concerning channel estimation and channel tracking.

Ideally, the OFDM modulation system would keep all the advantages of classic OFDM and additionally allow very simple and completely blind channel estimation at the receiver. No additional redundancy would be added to the system and therefore no bandwidth would be lost. Such a system would be advantageous in low-mobility scenarios and would make OFDM systems applicable to high-mobility scenarios as well.

Many of the examples and illustrations presented below are based on the assumption N=4·D, that is to say that the size of the prefix (D samples) is assumed to be one quarter of the size of the useful OFDM symbol (N samples). This corresponds to the case of HiperLAN/2 or IEEE802.11. This restriction is introduced for sake of simplicity only. It will be appreciated that the examples and illustrations are applicable more generally to the case of N∈N$^+$, D∈N$^+$, the necessary adaptation being basically straightforward.

SUMMARY OF THE INVENTION

The present invention provides a method of, and a transmitter and a receiver for, communication using OFDM as described in the accompanying claims.

BRIEF DESCRIPTION OF THE DRAWINGS

FIG. 1 is a block schematic diagram of an OFDM communication system comprising a transmitter and a receiver in accordance with one embodiment of the invention, given by way of example, FIG. 2 is a schematic diagram of an OFDM frame in a signal appearing in operation of the system of FIG. 1, FIG. 3 is a matrix equation representing the channel impulse response for inter-block interference in operation of the system of FIG. 1, FIG. 4 is a matrix equation representing the channel impulse response for inter-symbol interference in operation of the system of FIG. 1, FIG. 5 is a matrix equation representing the combined channel impulse response in operation of the system of FIG. 1, FIG. 6 is a representation of a sub-matrix corresponding to the combined channel impulse response in operation of the system of FIG. 1 for a prefix part of the signal of FIG. 2, FIG. 7 represents the upper triangular sub-matrix of the channel matrix presented by FIG. 6, FIG. 8 represents the lower triangular sub-matrix of the channel matrix presented by FIG. 6, and FIG. 9 is a matrix equation representing signals appearing as a result of the combined channel impulse response in operation of one embodiment of a system of the kind shown in FIG. 1, FIG. 10 is a matrix equation representing signals appearing during channel estimation in operation of one embodiment of a system as shown in FIG. 1, FIG. 11 is a matrix equation representing signals appearing as a result of the combined channel impulse response in operation of another embodiment of a system of the kind shown in FIG. 1

DETAILED DESCRIPTION OF THE PREFERRED EMBODIMENT

Figure 12:
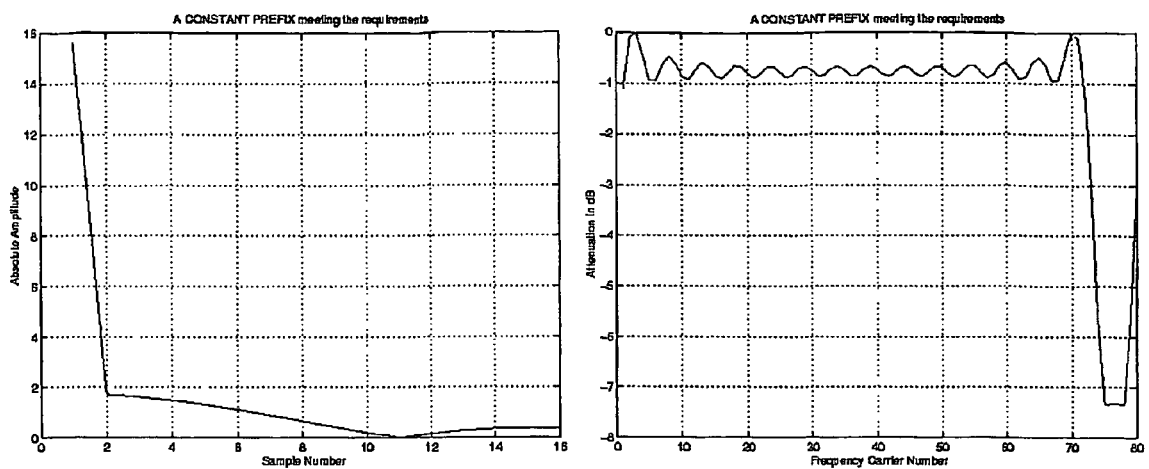
FIG. 12 is a graph representing preferred values of prefixes used in the system of FIG. 1.

FIG. 1 shows an OFDM communication system in accordance with one embodiment of the invention comprising a transmitter comprising an OFDM modulator 1 and a receiver comprising an OFDM demodulator 2, the transmitter and the receiver communicating over a communication channel 3.

An input bit-stream $b_n \in (0,1), n=0,1,\ldots,K-1$ is modulated onto a set of N carriers whose carrier amplitudes are given by the vector $X(k)=(X_0(k),X_1(k),\ldots,X_{N-1}(k))^T$, corresponding to OFDM symbol number k. Afterwards, the time domain OFDM signal is generated by means 4 which performs an Inverse Fourier Transform operation, or preferably an Inverse Fast Fourier Transform ('IFFT') operation $[F_N]^{-1}=[F_N]^H$ with $[F_N]^H=([F_N]^T)^*$ where $(\cdot)^T$ is the transposition operator and $(\cdot)^*$ is the complex conjugate operator:

$$x(k) = [F_N]^{-1} X(k) = (x_0(k), x_1(k), \ldots, x_{N-1}(k))^T., \quad \text{Equation 1}$$

where $$[F_N] = \frac{1}{\sqrt{N}} \cdot (W_N^{lk})_{0 \leq l \leq N-1, 0 \leq k \leq N-1},$$

and $W_N = e^{-j\frac{2\pi}{N}}$.

The resulting parallel signal x (k) vector is converted to a series signal by a parallel-to-series converter 5, a prefix, represented by the D×1 vector $P_D=(c_0,\ldots,c_{D-1})^T$, being inserted into the signal as guard interval between each OFDM symbol to produce a series digital signal $x_n$. The series digital signal $x_n$ is then converted to an analogue signal x(t) by a digital-to-analogue converter 6 and transmitted over the channel 3.

The channel 3 has a Channel Impulse Response H(k)=C(k) and also introduces noise v.

At the receiver 2, an analogue signal r(t) is received and converted to a digital signal $r_n$ by an analogue-to-digital converter 7. The digital signal $r_n$ is then converted to a parallel signal by a series-to-parallel converter r(k) and equalised and demodulated by equalisation and demodulation means 9 to produce demodulated signals $s^{est}(k)$. In the following analysis, consideration of noise is omitted for the sake for simplicity. However, including the consideration of noise does not significantly modify the results.

In some known OFDM communication systems, the guard interval is used to add some redundancy (D samples of redundancy are added) by introducing a cyclic prefix, for example in the following manner:

$$x^{(CP)}(k)=(x_{N-D}(k),\ldots,x_{N-1}(k),x_0(k),x_1(k),\ldots,x_{N-1}(k))^T.$$

In other words, data from the end of the frame is repeated by the transmitter in the guard interval to produce a prefix.

In accordance with this embodiment of the present invention, however, the prefix samples inserted as guard interval of OFDM symbol number k, $\alpha_k \cdot c_0$ to $\alpha_k \cdot c_{D-1}$, are deterministic and are known to said receiver as well as to said transmitter. The prefixes comprise a vector $P_D=(c_0,\ldots,c_{D-1})^T$ of size D×1 that is common to the symbols multiplied by at least one weighting factor $\alpha_k$, so that the prefixes have the overall form $\alpha_k \cdot c_0$ to $\alpha_k \cdot c_{D-1}$. The weighting factor $\alpha_k$ may be constant from one symbol to another. However, in a preferred embodiment of the invention, the weighting factor $\alpha_k$ differs from one symbol to another, the elements of a given vector $P_D$ being multiplied by the same weighting factor. With an OFDM modulator in the transmitter functioning in this way, blind channel estimation in the receiver can be done simply and at low arithmetical complexity. In particular, the receiver can constantly estimate and track the channel impulse response without any loss of data bandwidth. Moreover, the demodulator at the receiver can have advantageous characteristics, ranging from very low arithmetical cost (at medium performance) to high arithmetical cost (very good system performance).

More particularly, in the preferred embodiment of the invention, the prefix of D samples that is added in the guard interval comprises a pre-calculated suitable vector $P_D=(c_0,\ldots,c_{D-1})^T$ of D samples that is independent of the data and that is weighted by a pseudo-random factor $\alpha_k$ that only depends on the number k of the latest OFDM symbol:

$$x^{(const)}(k)=(\alpha_k c_0,\ldots,\alpha_k c_{D-1},x_0(k),x_1(k),\ldots,x_{N-1}(k))^T. \quad \text{Equation 2}$$

For the purposes of the analysis below, a second prefix/OFDM symbol vector is defined as follows:

$$x^{(const,post)}(k)=(x_0(k),x_1(k),\ldots,x_{N-1}(k),\alpha_{k+1}c_0,\ldots,\alpha_{k+1}c_{D-1})^T. \quad \text{Equation 3}$$

Several choices for $\alpha_k$ are possible. It is possible to choose $\alpha_k \in C$, that is to say that $\alpha_k$ can be of any complex value. However, any $\alpha_k$ with $|\alpha_k| \neq 1$ leads to performance degradation compared to preferred embodiments of the invention.

It is possible to limit the choice of $\alpha_k$, somewhat less generally to $\alpha_k \in C$ with $|\alpha_k|=1$. This choice usually leads to good system performance, but the decoding process risks to be unnecessarily complex.

Accordingly, in the preferred embodiment of the present invention, the phase of $\alpha_k$ is chosen so that $$\alpha_k = e^{j\frac{2\pi}{N+D} \cdot m},$$

where m is an integer, N is the useful OFDM symbol size and D is the size of the pseudo-random prefix. This choice is particularly advantageous when using the specific decoding methods described below.

For the sake of simplicity, the following analysis assumes that the weighting factor has been chosen as $$\alpha_k = e^{j\frac{2\pi}{N+D} \cdot m},$$

m integer. However, it will be appreciated that the mathematical adaptation to any of the cases presented above is straightforward.

It proves to be very useful to choose $a_k$ such that its phase changes from OFDM symbol to OFDM symbol. The constant prefix $P_D$ is preferably chosen with respect to certain criteria, for example the following:

In the frequency domain, $P_D$ is as flat as possible over the frequency band used for data carriers.

In the frequency domain, $P_D$ is as near to zero as possible for all unused parts of the band.

In the time domain, $P_D$ has a low peak-to-average-power-ratio (PAPR).

The length of $P_D$ is the size of the OFDM guard interval, that is to say D samples. Alternatively, a shorter sequence of length $\hat{D}<D$ may be chosen where $D-\hat{D}$ zeros are appended.

With these criteria, without any complication of the transmitter, the receiver is able to estimate the channel impulse response blindly, track the changes of the channel impulse response blindly and perform an arithmetically simple equalization.

An example of a frame of OFDM symbols in accordance with a preferred embodiment of the invention is illustrated in FIG. 2. The operation of the system will first be described for the specific case where $\alpha_k$ is constant and equal to 1.

Now, the modulation unit of the transmitter is clearly defined. In the following, the operations to be performed in the receiver are considered. Each received OFDM symbol selected at the input of the demodulator 9 can then be expressed as follows (neglecting additive noise):

$$r(k)=[H_{IBI}]\cdot x^{(const.post)}(k-1)+[H_{ISI}]\cdot x^{(const.post)}(k). \quad \text{Equation 4}$$

where the channel impulse response of the demodulator 9 is assumed to be $h=(h_0, \ldots, h_{D-1})$, $[H_{IBI}]$ is the contribution of the demodulator 9 channel matrix corresponding to inter-block-interference and $[H_{ISI}]$ is its contribution to inter-symbol-interference.

The components of the received signal corresponding to inter-block-interference $[H_{IBI}]r(k-1)$ are illustrated in FIG. 3, where blank elements correspond to zero values, for an example where $N=4\cdot D$ (for example, in the case of HiperLAN/2 or IEEE802.11, N=64 and D=16). It will be seen that $[H_{IBI}]$ is a matrix of size $(N+D)\times(N+D)$ with a triangular sub-matrix $[H_1]$ of size $(D-1)\times(D-1)$ at its upper right-hand corner, illustrated by FIG. 7, the other elements of the matrix being zero.

The components of the received signal corresponding to inter-symbol-interference $[H_{ISI}]r(k-1)$ are illustrated in FIG. 4, for the same case and in the same manner as FIG. 3. It will be seen that $[H_{ISI}]$ is a matrix of size $(N+D)\times(N+D)$ with triangular sub-matrices $[H_1]$ on its major diagonal as illustrated by FIG. 7 and triangular sub-matrices $[H_0]$ of size $D\times D$ on the diagonal immediately below the main diagonal as illustrated by FIG. 8, the other elements of the matrix being zero.

The channel impulse response seen by demodulator 9 is represented by the sum of the inter-block-interference $[H_{IBI}]$ and the inter-symbol-interference $[H_{ISI}]$, as shown in FIG. 5. The resulting signal for this example is shown in FIG. 9, where $r_0(k)$ to $r_4(k)$ are successive parts of the OFDM symbol #k containing as well contributions of the preceding and following prefix convolved by the channel, $x_0(k)$ to $x_3(k)$ are corresponding parts of size D of the useful signal transmitted and $x_4(k)$ is a corresponding part of size D of the following prefix in this example. Of course, the example may be generalised to any $N\in\mathbb{N}^+$, $D\in\mathbb{N}^+$.

The expectation values of the parts of the received signals are as follows:

$$E_0 = E(r_0) \quad \text{Equation 5}$$
$$= \underbrace{E([H_0]\cdot x_0(k))}_{=0} + E([H_1]\cdot x_4(k))$$
$$= [H_1]\cdot P_D$$

$$E_1 = E(r_1) \quad \text{Equation 6}$$
$$= \underbrace{E([H_1]\cdot x_0(k))}_{=0} + \underbrace{E([H_0]\cdot x_1(k))}_{=0} = 0$$

-continued $$E_2 = E(r_2) \quad \text{Equation 7}$$
$$= \underbrace{E([H_1]\cdot x_1(k))}_{=0} + \underbrace{E([H_0]\cdot x_2(k))}_{=0} = 0$$

$$E_3 = E(r_3) \quad \text{Equation 8}$$
$$= \underbrace{E([H_1]\cdot x_2(k))}_{=0} + \underbrace{E([H_0]\cdot x_3(k))}_{=0} = 0$$

$$E_4 = E(r_4) \quad \text{Equation 9}$$
$$= \underbrace{E([H_1]\cdot x_3(k))}_{=0} + E([H_0]\cdot x_4(k))$$
$$= [H_0]\cdot P_D$$

It will be appreciated that the expectation values of the useful parts $x_0(k)$ to $x_3(k)$ of the OFDM symbol tend to zero over a large number of symbols since they are quasi-random with zero mean. However, the prefix $P_D$ is known to the receiver (and in this embodiment is constant over successive symbols) and enables $\lfloor H \rfloor = [H_0]+[H_1]$ to be estimated, by approximating the expectation values $E_0$ and $E_4$ over a large number R of symbols:

$$E(r) \approx \frac{1}{R}\cdot\sum_{l=0}^{R-1} r(l). \quad \text{Equation 10}$$

The sum of the expectation values $E_0$ and $E_4$ is then given by:

$$E_0+E_4=([H_0]+[H_1])\cdot P_D=[H]\cdot P_D \quad \text{Equation 11}$$

A first embodiment of a method of channel impulse response estimation on D symbols in accordance with the present invention utilises the expression of the above equation as follows:

$$[H_0]\cdot P_D + [H_1]\cdot P_D = \boxed{[H]}\cdot P_D \quad \text{Equation 1}$$
$$= [F_D]^{-1}\cdot diag(H_0, H_1, \ldots, H_{D-1})\cdot$$
$$[F_D]\cdot P_D$$

where the matrices $[F_D]$ and $[F_D]^{-1}=[F_D]^H=([F_D]^T)^*$ are the (Fast) Fourier Transform and Inverse (Fast) Fourier Transform matrices respectively and the prefix $P_D$ is of size D. The matrices $[H_0]$, $[H_1]$ and $[H]$ are illustrated by FIG. 7, FIG. 8 and FIG. 6 respectively.

Accordingly, in this first method, the channel impulse response is estimated using the following steps:

Perform a $FFT_{D\times D}$ on $V_{HP}=([H_0]+[H_1])\cdot P_D=E_0+E_4$
Perform a $FFT_{D\times D}$ on $V_P=P_D$
Perform a component-by-component division of the first result by the second $\hat{H}_D^{(F)}=V_{HP}\oslash V_P$:

$$\hat{H}_D^{(F)}=FFT_{D\times D}(([H_0]+[H_1])\cdot P_D)\oslash FFT_{D\times D}(P_D).$$

Perform an IFFT on $\hat{H}_D^{(F)}$:

$$\hat{h}_D=FFT_{D\times D}^{-1}(\hat{H}_D^{(F)}).$$

The resulting channel estimation is $\hat{h}_D$ of size $D\times 1$. This method works well in many circumstances and has a low arithmetic cost, since its calculations are based on matrices of size $D\times D$. However, an OFDM symbol which usually is of size N>D samples will be equalized based on this estimation.

Thus, this method works very well if the prefix-spectrum is non-zero everywhere in the $FFT_{D \times D}$ domain (and, of course, everywhere well above channel noise). This can be a troublesome limitation in other circumstances.

A second embodiment of a method of channel impulse response estimation on D carriers in accordance with the present invention avoids this limitation, at the expense of increased arithmetic cost. This second method does not estimate $\hat{h}_D$ based on a de-convolution in the $FFT_{D \times D}$ domain as presented above, but estimates $FFT_{(N+D) \times (N+D)}((\hat{h}_D{}^T 0_N{}^T)^T)$ directly based on the received vector $([H_0]+[H_1]) \cdot P_D$. This is possible by exploiting the observation:

$$[H_{(N+D) \times (N+D)}] \cdot (P_D{}^T 0_N{}^T)^T = (E_4{}^T E_0{}^T 0_{N-D}{}^T)^T \quad \text{Equation 13}$$

Figures 10, 11:
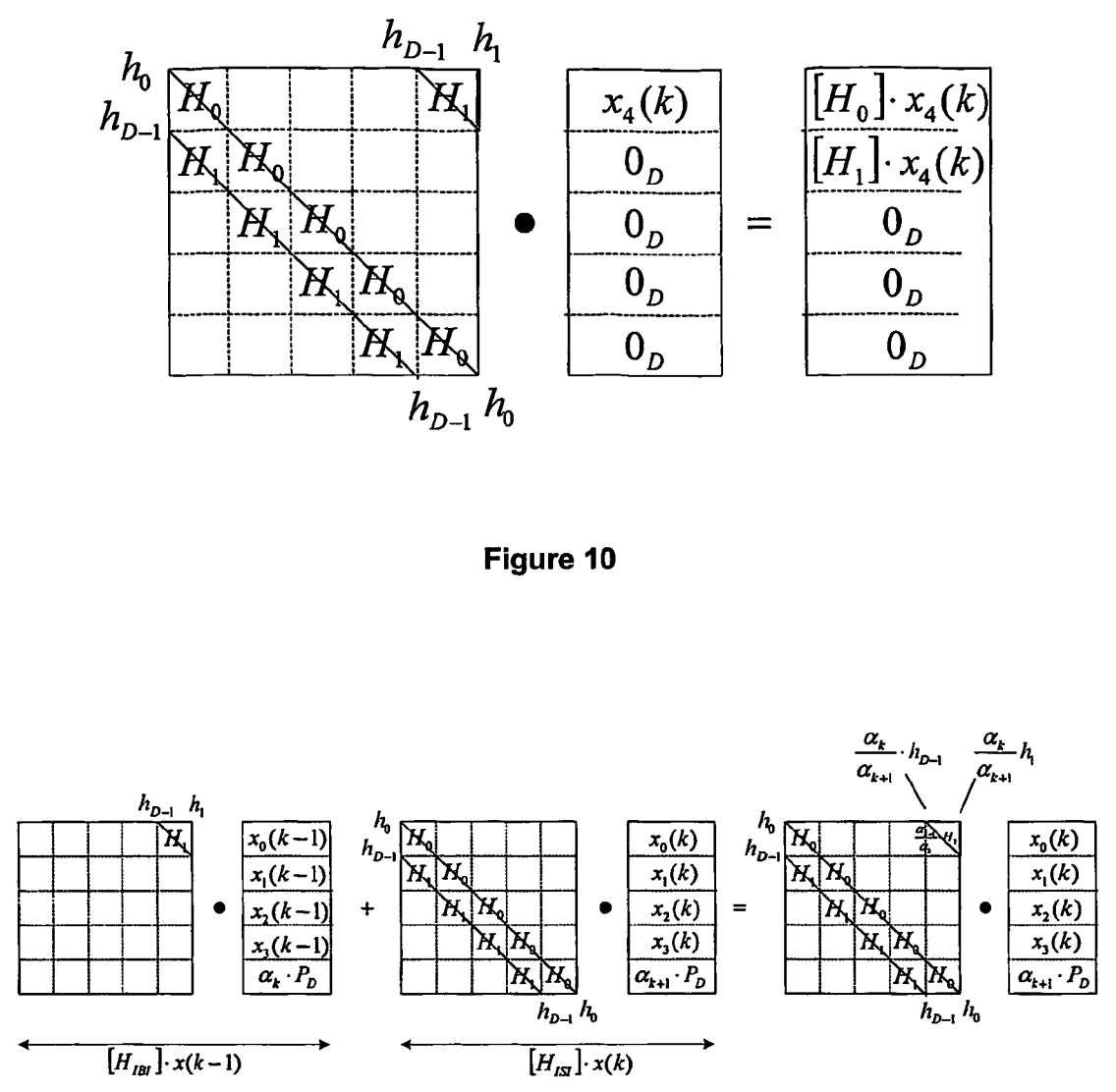

This equation is represented in more detail in FIG. 10. In this second method, the channel impulse response is estimated using the following steps:

Perform a $FFT_{(N+D) \times (N+D)}$ on $V_{HP} = [H_{(N+D) \times (N+D)}] \cdot (P_D{}^T 0_N{}^T)^T$ Perform a $FFT_{(N+D) \times (N+D)}$ on $V_P = (P_D{}^T 0_N{}^T)^T$ Perform a component-by-component division $\hat{H}_{N+D}{}^{(F)} = V_{HP} \oslash V_P$ If desired, perform an IFFT on $\hat{H}_{(N+D)}{}^{(F)}$: $\hat{h}_{(N+D)} = IFFT_{(N+D) \times (N+D)}(\hat{H}_{N+D}{}^{(F)})$ The last step of the list presented above is not essential for the basic equalization algorithm but may be useful, for example in algorithms used to reduce noise levels.

The above methods have been described with reference to the specific case where $\alpha_k$ is constant and equal to 1. In preferred embodiments of the invention, however, the weight $\alpha_k$ of the prefix to each symbol k is a preferably complex pseudo-random factor that only depends on the number k of the latest OFDM symbol. The adaptations to this method of the basic equations (shown in FIG. 9) are shown in FIG. 11.

It is found that equations 4 and 8 are to be adapted as follows:

$$E_{\alpha,0} = \underbrace{E([H_0] \cdot r_0(k))}_{=0} + E\left([H_1] \cdot \frac{(\alpha_k \cdot P_D)}{\alpha_k}\right) \quad \text{Equation 14}$$

$$= [H_1] \cdot P_D.$$

$$E_{\alpha,4} = \underbrace{E([H_1] \cdot r_3(k))}_{=0} + E\left([H_0] \cdot \frac{(\alpha_{k+1} \cdot P_D)}{\alpha_{k+1}}\right) \quad \text{Equation 15}$$

$$= [H_0] \cdot P_D.$$

The procedures for blind channel estimation described above remain applicable by setting $E_0 = E_{\alpha,0}$ and $E_4 = E_{\alpha,4}$. This amounts to weighting the preceding and following D prefix-samples of each received symbol by the corresponding $\alpha_k{}^{-1}$ or $\alpha_{k+1}{}^{-1}$ respectively.

The values of the prefixes $\alpha_k \cdot P_D$ are chosen as a function of selected criteria, as mentioned above. Values that have been found to give good results with the criteria:

Low Peak-to-Average-Power-Ratio of the time domain signal

Low Out-of-Band Radiation, that is to say maximise the energy of the prefix over the useful band and not waste prefix energy over null carriers Spectral Flatness, e.g. SNR of each channel estimates shall be approx. constant Low-Complexity Channel Estimation, i.e. by prefix spectrum whose spectral contributions are mainly just phases (i.e. of constant modulus), are shown in FIG. 12 by way of example, for the following OFDM parameters:

Size of the Prefix in Time Domain: D=16 Samples

Size of the OFDM symbols in the frame: N=64 Samples

Carriers where channel coefficients are to be estimated (over N+D=80 carriers): Carriers 1 to 52

Out-of-Band region: Carriers 76 to 80

Maximum PAPR has not been limited

Out-of-Band Radiation as low as possible

Spectral Flatness as good as possible.

The channel estimation is done by calculating the expectation value over a number of samples of the received vector as explained above. If the tracking of the channel is done based on a first estimation $\hat{h}(k-1) = [F_D]^H \cdot \hat{H}(k-1)$ of the channel impulse response and a number R of OFDM symbols, the first estimate is then updated as follows:

$$\hat{H}(k) = s_0 \cdot \hat{H}(k-1) + \left([F_D] \cdot \sum_{n=0}^{R-1} s_{n+1} \cdot (E_0(k-n) + E_4(k-n))\right) \oslash ([F_D] \cdot P_D)$$

$$\hat{h}(k) = [F_D]^H \hat{H}(k).$$

based on the ideas of the first method for channel estimation that has been presented above. Alternatively, the second method can be applied by $$\hat{H}(k) = s_0 \cdot \hat{H}(k-1) + \left([F_{N+D}] \cdot \sum_{n=0}^{R-1} s_{n+1} \cdot (E_4^T(k-n), E_0^T(k-n), 0_{N-D}^T)^T\right)$$

$$\oslash ([F_{N+D}] \cdot (P_D^T, 0_N^T)^T)$$

$$\hat{h}(k) = [F_{N+D}]^H \hat{H}(k).$$

where the factors $s_n$, n=0,1, . . . ,R−1 are positive real numbers that are used for normalization and weighting of the different contributions. Thus, for example it is possible to take older OFDM symbols less into account for the channel estimation than later ones. The Fourier matrix [F] can be chosen in the N+D carriers or D carriers domain Several equalization methods are advantageous using the pseudo-random prefix OFDM. In general, the different methods offer different performance-complexity trade-offs.

A first embodiment of a method of equalization uses zero forcing in the N+D Domain and offers low complexity equalization.

With $$\beta_k = \frac{\alpha_k}{\alpha_{k+1}},$$

the Channel Impulse Response matrix can be represented as follows:

$$[H] = [H_{ISI}] + \frac{\alpha_k}{\alpha_{k+1}} \cdot [H_{IBI}] = [H_{ISI}] + \beta_k \cdot [H_{IBI}] \quad \text{Equation 16}$$

$$= \begin{bmatrix} h_0 & \beta_k \cdot h_{N+D-1} & \beta_k \cdot h_{N+D-2} & \ldots & \ldots & \beta_k \cdot h_1 \\ h_1 & h_0 & \beta_k \cdot h_{N+D-1} & \ldots & \ldots & \beta_k \cdot h_2 \\ \ldots & \ldots & \ldots & \ldots & \ldots & \ldots \\ h_{N+D-1} & \ldots & \ldots & \ldots & \ldots & h_0 \end{bmatrix}$$

Still assuming that the length of the channel impulse response is D, the coefficients $h_{D+1}, \ldots, h_{N+D-1}$ are set to zero. This is a so-called pseudo-circulant matrix, corresponding to the case where $\beta_k$ is not equal to 1, and can be diagonalized as follows:

$$[H] = \frac{1}{\sqrt{N+D}} \cdot [V]^{-1} \cdot diag\left(H\left(\beta_k^{\frac{1}{N+D}}\right), H\left(e^{j \cdot \frac{2\pi}{N+D}} \cdot \beta_k^{\frac{1}{N+D}}\right), \ldots, H\left(e^{j \cdot \frac{2\pi}{N+D}(N+D-1)} \cdot \beta_k^{\frac{1}{N+D}}\right)\right) \cdot [V] \cdot \sqrt{N+D}.$$  Equation 17 where $$[V] = \left(\sum_{n=0}^{N+D-1} |\beta_k|^{\frac{2n}{N+D}}\right)^{\frac{1}{2}} \cdot [F_{N+D}] \cdot diag\left\{1, \beta_k^{\frac{1}{N+D}}, \ldots, \beta_k^{\frac{N+D-1}{N+D}}\right\}$$

and $$H(z) = \sum_{n=0}^{N+D-1} z^{-n} \cdot h_n$$

With the assumption that $r(k) = [H] \cdot (x(k)^T P_D^T)^T$, and that the weighting factor has been chosen as $$\beta_k = \frac{\alpha_k}{\alpha_{k+1}} = e^{j \frac{2\pi}{N+D} \cdot m},$$

where m is an integer, and if the received vector R(k) is:

$$R(k) = [H_{\alpha_k,(N+D)\times(N+D)}] \cdot (x(k)^T P_D^T)^T,$$

the procedure of this method of zero forcing equalisation is:

Perform Multiplication $R^{(1)}(k) = \sqrt{N+D} \cdot [V] \cdot R(k)$, where $$[V] = \left(\sum_{n=0}^{N+D-1} |\beta_k|^{\frac{2n}{N+D}}\right)^{\frac{1}{2}} \cdot [F_{N+D}] \cdot diag\left\{1, \beta_k^{\frac{1}{N+D}}, \ldots, \beta_k^{\frac{N+D-1}{N+D}}\right\},$$

Calculate the frequency shifted, estimated CIR coefficients $$\hat{H}_{N+D}^{Shifted,F} = \left(\hat{H}\left(\beta_k^{\frac{1}{N+D}}\right), \ldots, \hat{H}\left(\beta_k^{\frac{1}{N+D}} \cdot e^{j2\pi \frac{N+D-1}{N+D}}\right)\right).$$

Perform a component-by-component division $R^{(2)}(k) = R^{(1)}(k) \oslash \hat{H}_{N+D}^{Shifted,F}$ Perform Multiplication $$R^{(3)}(k) = \frac{1}{\sqrt{N+D}} \cdot [V]^{-1} \cdot R^{(2)}(k).$$

Extract the N equalized samples of the kth OFDM-data symbol to $S^{EQ}(k)$.

Transform the kth OFDM data symbol $S^{EQ}(k)$ into the frequency domain by a Fourier transform $S_F^{EQ}(k) = [F_N] \cdot S^{EQ}(k)$.

Proceed with metric calculation, etc. on the received equalised carriers.

Another embodiment of a method of equalization uses a method known from studies on zero padding. The received vector R(k) in the OFDM Pseudo Random Prefix Scheme can be expressed as follows, where [P] contains a (N+D)×N precoding matrix and $I_N$ is the N×N identity matrix:

$$R(k) = [H] \cdot \left([P] \cdot x(k) + \begin{bmatrix} 0_{N \times N} \\ \alpha_{k+1} \cdot P_D \end{bmatrix}\right) + v$$

$$= [H] \cdot \left(\begin{bmatrix} I_N \\ 0_{D \times N} \end{bmatrix} \cdot x(k) + \begin{bmatrix} 0_{N \times N} \\ \alpha_{k+1} \cdot P_D \end{bmatrix}\right) + v$$  Equation 18

The Channel Impulse Response estimation obtained as described above is then used together with the known values of $P_D$ to perform the following operation $$R^{(1)}(k) = R(k) - [\hat{H}] \cdot \begin{bmatrix} 0_{N \times N} \\ \alpha_{k+1} \cdot P_D \end{bmatrix}$$

$$= [H] \cdot \begin{bmatrix} I_N \\ 0_{D \times N} \end{bmatrix} \cdot x(k) + v$$  Equation 19 in which the known prefix values are multiplied by the Channel Impulse Response estimation and the result subtracted from the received signal. In the general case, [H] is a pseudo circulant channel matrix. So, the diagonalisation of such matrices can then be performed in order to calculate $[H] \cdot P_D$ efficiently. Then, several equalization approaches are possible, for example the Zero Forcing (ZF) approach or the Minimum Mean Square Error (MMSE) equalization approach. Examples of MMSE equalization methods are described in the articles *"OFDM with trailing zeros versus OFDM with cyclic prefix: links, comparisons and application to the HiperLAN/2 system"* by Muquet, B.; de Courville, M.; Dunamel, P.; Giannakis, G. ICC 2000 - IEEE International Conference on Communications, Volume 2, 2000 and *"Reduced Complexity Equalizers for Zero-Padded OFDM transmissions"* by Muquet, B.; de Courville, M.; Giannakis, G. B.; Wang, Z.; Duhamel, P. International Conference on Acoustics Speech and Signal Processing (ICASSP) 2000.

In one example, the equalisation is performed based on a zero-forcing approach by multiplying $y^{(1)}$ by the Moore-Penrose pseudo-inverse [G] of the matrix $$[H] \cdot \begin{bmatrix} I_N \\ 0_{D \times N} \end{bmatrix} \cdot [G] = \left[ [H] \cdot \begin{bmatrix} I_N \\ 0_{D \times N} \end{bmatrix} \right]^+.$$

Thus, the equalized resulting vector is $$R^{(eq,ZF)}(k) = [G] \cdot R^{(1)}(k) \quad \text{Equation 20}$$
$$= [G] \cdot \left[ [H] \cdot \begin{bmatrix} I_N \\ 0_{D \times N} \end{bmatrix} \cdot x(k) + v \right].$$

The definition of the Moore-Penrose pseudo-inverse is, among others, discussed by Haykin in the book: *"Adaptive Filter Theory"* by Simon Haykin, 3$^{rd}$ edition, Prentice Hall Information and System Science Series, 1996. Haykin uses the common definition $$[A]^+ = (A^H A)^{-1} A^H. \quad \text{Equation 21}$$

where [A] is a rectangular matrix.

The invention claimed is:

1. A method of communication using Orthogonal Frequency Division Multiplexing ("OFDM"), the method comprising the steps of:
   generating bit streams $b_n \in (0,1)$, n=0,1, . . . ,K−1 and the corresponding sets of frequency domain carrier amplitudes ($X_0(k)$ to $X_N(k)$), where k is the OFDM symbol number, modulated as OFDM symbols to be transmitted from a transmitter,
   inserting prefixes as guard intervals in said sample streams,
   transmitting said OFDM symbols from said transmitter to a receiver,
   using information from said prefixes to estimate the Channel Impulse Response ($H_D^{(F)}$) of the transmission channels at the receiver, where ($H_D^{(F)}$) is the length D vector defined as the channel impulse response vector in the frequency domain, denoted by superscripted, F, and
   using the estimated Channel Impulse Response ($\hat{H}_D^{(F)}$) to demodulate said bit streams in the signals received at said receiver, wherein said prefixes ($\alpha_k c_0$ to $\alpha_k c_{D-1}$) are deterministic and are known to said receiver as well as to said transmitter, where c is the set of vectors containing constant postfix samples, ($\alpha_k$) is a weighting factor proportional to $$e^{j\frac{2\pi}{N+D}m},$$

where J is the square root of −1, N is the useful OFDM symbol size, D is the size of the prefix vector, and m is an integer, and further performing the multiplication by a matrix proportional to $$R^{(1)}(k) = \sqrt{N+D} \cdot [\hat{V}] \cdot r(k),$$

where $$[\hat{V}] = \left( \sum_{n=0}^{N+D-1} |\beta_k| - \frac{2n}{N+D} \right)^{-\frac{1}{2}} \cdot$$
$$\text{diag}\left\{ 1, \beta_k \frac{1}{N+D}, \ldots, \beta_k \frac{N\_D-1}{N+D} \right\},$$

where $\beta_k$ is the ratio of consecutive $\alpha_k$, $$\beta_k = \frac{a_k}{a_{k+1}},$$

calculating the frequency shifted CIR coefficients $$\hat{H}_{N+D}^{Shifted,F} = \begin{pmatrix} \hat{H}\left(\beta_k - \frac{1}{N+D}\right) \ldots, \\ \hat{H}\left(\beta_k - \frac{1}{N+D} \cdot e^{j2\pi \frac{N+D-1}{N+D}}\right) \end{pmatrix},$$

performing a component-by-component division $$R^{(2)}(k) = R^{(1)}(k) = \bigotimes \hat{H}_{N+D}^{Shifted,F},$$

performing a multiplication by a matrix proportional to $$R^{(3)}(k) = [\hat{V}]^{-1} \cdot \frac{1}{\sqrt{N+D}} \cdot R^{(2)}(k),$$

extracting the N equalized samples corresponding to the $k^{th}$ data symbol to the vector $S^{EQ}(k)$, and
transforming the symbol ŝ(k) into frequency domain by performing a Fourier Transform: $S_{(F)}^{EQ}(k) = [F_{N \times N}] \cdot S^{EQ}(k)$.

2. A method of communication as claimed in claim 1, wherein said prefixes ($\alpha_k c_0$ to $\alpha_k c_{D-1}$) comprise a vector ($P_D$) that is common to said symbols multiplied by at least one weighting factor ($\alpha_k$).

3. A method of communication as claimed in claim 2, wherein said weighting factor ($\alpha_k$) differs from one symbol to another but the elements of a given vector ($P_D$) are multiplied by the same weighting factor.

4. A method of communication as claimed in claim 3, wherein said weighting factor ($\alpha_k$) has a pseudo-random value.

5. A method of communication as claimed in claim 1, wherein said weighting factor ($\alpha_k$) is a complex value.

6. A method of communication as claimed in claim 5, wherein the modulus of said weighting factor ($\alpha_k$) is constant from one symbol to another.

7. A method of communication as claimed in claim 1, wherein estimating said Channel Impulse Response $$\left( H_D^{(F)} \right)$$

comprises performing a Fourier Transform on a first vector ($V_{HP}$) that comprises the received signal components corresponding to one of said prefixes ($\alpha_k.c_0$ to $\alpha_k.c_{D-1}$) and also the received signal components corresponding to the following one of said prefixes to produce a received prefix signal transform ($V_{HP,F}$), performing a similar Fourier transform on a second vector ($V_p$) that comprises the known values of corresponding components of said prefixes ($\alpha_{k+1}.c_0$ to $\alpha_{k1}.c_{D-1}$) and also the received signal components corresponding to the following one of said prefixes ($\alpha_k.c_0$ to $\alpha_k.c_{D-1}$, $\alpha_{k+1}.c_0$ to $\alpha_{k+1}.c_{D-1}$) to produce a known prefix transform ($V_{P,F}$), and performing a component-by-component division of the receiving prefix signal transform ($V_{HP,F}$) by known prefix transform ($V_{P,F}$).

8. A method of communication s claimed in claim 7, wherein said prefixes comprise a vector ($P_D$) that is common to said symbols multiplied by weighting factors ($\alpha_k$, $\alpha_{k+1}$), said weighting factors differing from one symbol to another but the elements of a given vector being multiplied by the same weighting factor, and wherein the received signal components corresponding to said one of said prefixes ($\alpha_k.c_0$ to $\alpha_k.c_{D-1}$) and said following one of said prefixes ($\alpha_{k+1}.c_0$ to $\alpha_{k+1}.c_{D-1}$) are weighted by the respective value of said weighting factor ($\alpha_k$, $\alpha_{k+1}$) before summing and performing said Fourier Transform to produce said received prefix signal transform ($V_{HP,F}$).

9. A method of communication as claimed in claim 7, wherein said Fourier Transforms are of dimension D×D, where D is the size of said prefixes ($c_0.\alpha_k$ to $c_{D-1}.\alpha_k$).

10. A method of communication as claimed in claim 7, wherein said Fourier Transforms are of dimension (D+N)×(D+N), where D is the size of said prefixes ($\alpha_k.c_0$ to $\alpha_k.c_{D-1}$) and N is the size of the OFDM signals between said prefixes, said first vector ($V_{HP}$) comprises said sum of said received signal components corresponding to one of said prefixes ($\alpha_k.c_0$ to $\alpha_k.c_{D-1}$) and of the following one of said prefixes ($\alpha_{k+1}.c_0$ to $\alpha_{k+1}.c_{D-1}$) augmented by a zero value vector ($0_N^T$) of size (N) to produce said received prefix signal transform ($V_{HP,F}$) of size (N+D), and said second vector ($V_P$) comprises said known components of said prefixes (($\alpha_k.c_0$ to $\alpha_k.c_{D-1}$, $\alpha_{k+1}.c_0$ to $\alpha_{k+1}.c_{D-1}$) augmented by said zero value vector ($0_N^T$) of size (N) to produce said known prefix transform ($V_{P,F}$) of size (N+D).

11. A method of communication as claimed in claim 1, wherein estimating said Channel Impulse Response ($H_D^{(F)}$) comprises combining information from said prefixes ($\alpha_k.c_0$ to $\alpha_k.c_{D-1}$, $\alpha_{k+1}.c_0$ to $\alpha_{k+1}.c_{D-1}$) for more than one symbol to obtain said estimated Channel Impulse Response ($\hat{H}_D^{(F)}$).

12. A method of communication s claimed in claim 1, wherein demodulating said bit streams includes padding the received signal matrix and the operator matrices with zeros to obtain compatible dimensions for subsequent operations, multiplying the known prefix value matrix by the Channel Impulse Response estimation matrix and subtracting the result from the received signal matrix.

13. A transmitter for use in a method of communication as claimed in claim 1 and comprising generating means for generating bit streams $b_n \epsilon (0,1), n=0,1,\ldots,K-1$ modulated as OFDM symbols to be transmitted and inserting prefixes as guard intervals between said OFDM symbols, said prefixes ($\alpha_k.c_0$ to $\alpha_k.c_{D-1}$) being deterministic and suitable to be known to said receiver as well as to said transmitter.

14. A receiver for use in a method of communication as claimed in claim 1 and comprising demodulating means for receiving signals that comprise bit streams $b_n \epsilon (0, 1)$, $n=0,1\ldots,K-1$ modulated as OFDM symbols to be transmitted from a transmitter, with prefixes inserted in guard intervals from said transmitter to said receiver, said demodulating means being arranged to use information from said prefixes to estimate the Channel Impulse Response ($H_D^{(F)}$) of the transmission channels and to use the estimated Channel Impulse Response ($\hat{H}_D^{(F)}$) to demodulate said bit streams in the signals received at said receiver, said prefixes ($\alpha_k.c_0$ to $\alpha_k.c_{D-1}$) being deterministic and being known to said receiver as well as to said transmitter.

\* \* \* \* \*

UNITED STATES PATENT AND TRADEMARK OFFICE
CERTIFICATE OF CORRECTION

PATENT NO.       : 7,450,490 B2  
APPLICATION NO.  : 10/531785  
DATED            : November 11, 2008  
INVENTOR(S)      : Muck et al.

Page 1 of 1

It is certified that error appears in the above-identified patent and that said Letters Patent is hereby corrected as shown below:

In Column 4, Line 58, delete "ak" insert -- αk --, therefor.

In Column 7, Line 21, delete " $V_{HP}=[H_{(N+D)\times(N+D)}]\cdot(PD^T 0_N^T)^T$ " and insert -- $V_{HP} = [H_{(N+D)\times(N+D)}]\cdot(P_D^T 0_N^T)^T$ --, therefor.

In Column 11, Line 58, in Claim 1, delete "J" and insert -- j --, therefor.

In Column 12, Lines 4 to 8, in Claim 1, delete " $[\hat{V}] = \left(\sum_{n=0}^{N+D-1} |\beta_k| - \frac{2n}{N+D}\right)^{-\frac{1}{2}} diag\left\{1, \beta_k \frac{1}{N+D}, \ldots, \beta_k \frac{N\_D-1}{N+D}\right\}$ ,"

and insert -- $[\hat{V}] = \left(\sum_{n=0}^{N+D-1} |\beta_k|^{\frac{2n}{N+D}}\right)^{\frac{1}{2}} \cdot diag\left\{1, \beta_k^{\frac{1}{N+D}}, \ldots, \beta_k^{\frac{N+D-1}{N+D}}\right\}$ --, therefor.

In Column 12, Line 40, in Claim 1, delete " $S_{(F)}^{\hat{EQ}}(k)=[F_{N\times N}]\cdot S^{EQ}$ " and insert -- $S_F^{EQ}(k) = [F_{N\times N}]\cdot S^{EQ}$ --, therefor.

Signed and Sealed this

Thirteenth Day of October, 2009

David J. Kappos  
*Director of the United States Patent and Trademark Office*